(12) United States Patent
Diefenbach et al.

(10) Patent No.: US 7,352,108 B2
(45) Date of Patent: Apr. 1, 2008

(54) PIEZOELECTRIC DRIVING DEVICE AND A REGULATION METHOD FOR A PIEZOELECTRIC DRIVING DEVICE

(75) Inventors: Gerhard Diefenbach, Aachen (DE); Christian Reichinger, Neutraubling (DE); Hans Steinbusch, Landgraaf (NL); Matthias Wendt, Wuerselen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 94 days.

(21) Appl. No.: 10/303,980

(22) Filed: Nov. 25, 2002

(65) Prior Publication Data

US 2006/0267452 A1    Nov. 30, 2006

(30) Foreign Application Priority Data

Nov. 29, 2001    (DE) ................................ 101 58 584

(51) Int. Cl.
*H01L 41/08* (2006.01)
(52) U.S. Cl. .............................. 310/316.02; 310/316.01
(58) Field of Classification Search ........... 310/316.01, 310/316.02, 317, 319
See application file for complete search history.

(56) References Cited

U.S. PATENT DOCUMENTS

| | | | | |
|---|---|---|---|---|
| 4,888,514 A | | 12/1989 | Takahashi et al. ........... 310/316 |
| 5,130,619 A | * | 7/1992 | Izuno ........................... 318/116 |
| 5,153,486 A | * | 10/1992 | Hirotomi ...................... 318/116 |
| 5,192,889 A | | 3/1993 | Myohga ....................... 310/316 |
| 5,416,374 A | * | 5/1995 | Inoue et al. ................. 310/317 |
| 5,780,955 A | * | 7/1998 | Iino et al. ............... 310/316.02 |
| 6,661,154 B2 | * | 12/2003 | Shibatani ............... 310/316.01 |
| 6,954,022 B2 | * | 10/2005 | Kataoka ...................... 310/317 |

FOREIGN PATENT DOCUMENTS

| | | |
|---|---|---|
| DE | 1001070 | 1/1957 |
| DE | 19817038 | 10/1999 |
| DE | 19942269 | 3/2001 |
| DE | 10008937 | 8/2001 |
| EP | 0432881 A1 | 6/1991 |
| EP | 0633616 | 1/1995 |
| EP | 0654889 | 5/1995 |
| JP | 3145976 | 6/1991 |
| JP | 05328759 | 12/1993 |

* cited by examiner

*Primary Examiner*—Mark Budd

(57) ABSTRACT

A piezoelectric driving device and a regulation method for a piezoelectric driving device are proposed. Piezoelectric driving devices known so far show a characteristic with which the electric power applied to the motor drops when the load increases. This behavior, which leads to a strong reduction of the range of use of such motors, is counteracted by predefining the amplitude of the excitation voltage so that the effective power does not drop with increasing load. For this purpose the electrical effective power is determined from the excitation voltage and the current flowing through the piezoelectric resonator. Alternatively, with a predefined fixed phase angle between excitation voltage and current a regulation may also be effected in the way that the current is kept to the constant value. A further aspect of the invention relates to a unit for limiting the current flowing through the piezoelectric resonator, so as to avoid this component being damaged.

10 Claims, 5 Drawing Sheets

PIEZOELECTRIC DRIVING DEVICE AND A REGULATION METHOD FOR A PIEZOELECTRIC DRIVING DEVICE

The invention relates to a piezoelectric driving device and a regulation method for a piezoelectric driving device as well as an electric shaver.

Piezoelectric driving devices are used as electric drives for converting electrical energy into mechanical energy while using the piezo effect. A moving member, for example a shaft or a rotor is driven by it. A mechanical resonator with piezoelectrical excitation is excited to mechanical oscillations and thus drives the moving member while itself being supplied with one or more AC voltages having a suitable amplitude and frequency.

Known piezoelectric driving devices comprise both drives for shifting a moving member in longitudinal direction, for example the shifting of a read/write head in a CD drive, and for driving a shaft in rotating fashion.

Several variants of the structure of piezoelectrical driving devices are known to the expert, which devices are all based on the electrical excitation of oscillations of one or more piezoelectric resonators.

A known structure of piezoelectrical driving devices is referred to as a traveling wave motor. Such drives are described, for example, in EP-A-0 654 889 or in U.S. Pat. No. 4,888,514. Known traveling wave motors are excited by two phase-shifted AC voltages. A first AC voltage generates a first standing wave on a mechanical resonator piezoelectrically excited by the AC voltage. A second voltage, which is phase shifted relative to the first voltage, generates a second standing wave. If the two waves show a suitable spatial and time-dependent shift, a rotary wave (traveling wave) is formed.

Another-known variant of piezoelectrical driving devices is the so-called micro shock pulse motor. The excitation with an AC voltage piezoelectrically excites a mechanical resonator to perform mechanical oscillations, the resonator periodically striking against the moving element and thus driving same. Examples for micro shock pulse motors are described in EP-A-0 633 616 and in DE-A-198 17 038, the latter patent dealing with a mechanical structure of such a piezomotor.

The excitation of the piezoelectric elements of such driving devices is effected by supplying one or more excitation AC voltages to the resonator. To this end various driving circuits are known. They generate the AC voltages necessary for the operation of the driving device, the parameters—more particularly amplitude, frequency and also the phase if a plurality of excitation voltages are required—of the excitation voltages are selected such that the resonator performs the desired driving function. This comprises the selection of a suitable frequency so that resonances of the piezoelement are excited.

For example EP-A-0 633 616 describes for a micro shock pulse motor which comprises as a basic element a plate of piezoelectric ceramic material with four electrodes, the excitation of diagonally opposite electrodes for generating a mechanical oscillation. The excitation is effected in the form of an AC voltage or a pulsed voltage.

U.S. Pat. No. 5,192,889 describes a driving circuit for a micro shock pulse motor. The driving circuit comprises a unit for generating two high-frequency AC voltages which have a mutual phase difference. It is indicated that a 90° phase difference is strived after for a micro shock pulse motor of the dual standing wave type. Furthermore it is indicated that the motor is driven at optimal excitation frequency. If this frequency changes, for example, as a result of external load, the phase difference is adjusted accordingly. A regulation device is proposed which sets the phase relation of the two excitation voltages on the first and second piezoelements on the basis of the measurement of the phase difference between excitation voltage and current through a piezoelement so that the voltage/current phase is minimized.

The driving of a piezotraveling wave motor for the rotational drive is also described in EP-A 654 889. According to this document a maximum-efficiency operation is achieved at a certain excitation frequency. Various regulation units are proposed which allow a regulation of the excitation voltages applied to the piezomotor. On the one hand, the amplitude of these AC voltages is set between a lower and an upper limit. In one example of embodiment there is also proposed to set the frequency of these AC voltages between a lower and an upper limit. In a further example of embodiment a feedback regulation for the speed of rotation of the rotor is described. A measuring device determines the speed of rotation of the rotor from which a deviation from a control value is calculated. Accordingly, the amplitude of the AC voltage is set. A further aspect of EP 0 654 889 is concerned with the setting of an optimum operation point of the piezomotor at which the latter works with maximum efficiency. To this end there is proposed to measure the phase difference between an excitation voltage and a monitoring voltage and by varying the excitation frequency to regulate it to such a value that the motor reaches an operation mode with optimum efficiency.

U.S. Pat. No. 4,888,514 also describes a driving circuit for a traveling wave piezomotor. A piezomotor is excited by applying two excitation AC voltages between which a phase difference from 10 to 170° is generated. There is described that the electrical properties of a piezoelement can be modeled by an equivalent circuit diagram in which its connecting capacitance is connected in parallel to a series combination of an inductance, a capacitance and an ohmic resistance, which combination is responsible for the vibration. The current flowing through this vibrating branch of the equivalent circuit diagram, which is proportional to mechanical vibration, is measured and compared with a predefined control value. The excitation frequency is set so that the current flowing through the piezoelement and thus the rotating speed remains constant in essence. However, from a representation of the motor characteristic it may be learnt that the rotating speed drops with increasing load. There is described that also the amplitude of the excitation voltage can be regulated.

DE-A-199 42 269 describes a micro piezomotor and a driving circuit for this. This driving circuit can manage without a special sensor electrode at the piezoelement where the feedback signal necessary for the regulation is always determined by the passive control electrode. The driving circuit excites the piezoelectric resonator each time with such a frequency that the resonator is driven with maximum efficiency. The amplitude of the excitation voltage is regulated in combination with this. For this purpose either the amplitude of the feedback signal or the phase difference between the excitation voltage and the feedback signal is evaluated.

A further driving circuit for a piezomotor is described in JP-A-3-145 976. In this document the phase difference between the input and output voltages of an inductance inserted into the electric line to the motor is determined and regulated by setting a respective frequency of the excitation voltage.

JP-A-2-226285 describes a driving circuit for a piezomotor. The current flowing from the driving circuit through the piezoelectric resonators is regulated to a constant value in that a suitable excitation frequency is set. However, it should then be borne in mind that it is not possible in this way to continuously drive the motor at a high-efficiency operating point.

DE-A-100 08 937 describes a phase control for a piezomotor. Alternatively, the phase of the excitation voltage is compared with the phase of the current flowing through the piezoelement, or the phase of the excitation voltage is compared with the phase of the voltage on a sensor electrode of the piezoelement. The frequency of the excitation voltage is set via a regulator so that a desired non-zero phase difference evolves.

It is an object of the invention to provide a piezoelectric driving device and a regulation method for this, as well as an electric shaver, in which the driving of the motor is effected such that a satisfactory operation is possible also with a variable load.

According to the invention the driving device comprises in addition to the piezoelectric resonator a driving circuit for supplying the resonator with at least one excitation AC voltage while the amplitude of this excitation AC voltage is set so that the driving device is supplied with sufficient effective power. The invention in this respect assumes that piezomotors of any construction do not consume more but less power with increasing load when driven by an excitation voltage of constant amplitude. This is expressed in that, for example, with a piezomotor that drives a rotating shaft, the number of rotations rapidly drops with increasing load. This motor characteristic distinguishes the piezomotor from the conventional electromotor which, driven at constant voltage, consumes higher current and thus more power when the torque increases.

Prior-art solutions in which only the amplitude of the excitation voltage was increased to cancel out, for example, variations of revolutions per minute have proved to be insufficient. With a piezomotor it is a matter of a complex load changing with conditions of the environment for the driving electronics. Therefore, the dependence of the motor power on the amplitude of the voltage is certainly not always linear.

In accordance with one embodiment, the effective power applied to the resonator is therefore determined and the amplitude of the excitation voltage is set so that this effective power does not drop with increasing load. This comprises a drive so that the effective power remains constant with increasing load. However, an embodiment is preferred in which the input power applied to the motor rises with increasing load so that, ideally, the revolutions per minute can largely be maintained at a constant level.

The unit for determining the effective power should be understood to be substantially purely functional i.e. this must not be a separate circuit or assembly that serves only this purpose. It is rather a more decisive factor that the information necessary for calculating the effective power is present via the voltage applied to the resonator and the current flowing through the resonator and is suitably combined so that the aim of an effective power remaining substantially constant under load is achieved by suitably setting the amplitude of the excitation voltage.

The regulation may be effected in a way that always the effective power is determined and the amplitude is set so that the effective power remains constant. The aim of preventing a drop of power consumption in case of increasing load can, however, according to a further embodiment, also be achieved in that the respective control value for the power is not constant but is determined on the basis of the measured data of a sensor. This is preferably a sensor for the velocity of the moving element of the motor i.e. a speed sensor for a rotary drive. Based on the knowledge about the piezomotor used and the device in which it can be inserted, an assignment—for example in the form of a Table or also in the form of a mathematical function—can be made for which the desired power value is predefined for a respectively measured velocity (or number of rotations). If, for example, the speed sensor reports that the motor runs at nominal speed, the nominal power of the motor is set as a control value for the power. If the measurement of the speed shows a drop of the motor speed, it is predefined, for example, via a Table that the control value for the motor power is set to a higher level. This higher control value for the motor rating is predefined by the man of skill in the art while the knowledge about the motor characteristic and the respective application is taken into account.

In this respect it should be borne in mind that the piezoelectric resonator is not a purely ohmic load. Instead, as is also known from the state of the art, there is generally a variable phase angle between the excitation voltage and the current flowing through the resonator. According to a further embodiment of the invention in which sinusoidal patterns of current and voltage are assumed, the effective power is generally determined from the amplitude of the excitation voltage, the amplitude of the current and the phase angle between excitation voltage and current. This may be effected by separately measuring said magnitudes and subsequent calculation.

According to a further aspect of the invention the phase angle, however, is not continuously measured but the driving circuit provides such a frequency of the excitation voltage that the phase angle is kept constant at a known value. Starting from this known value for the phase angle, the effective power can be very easily calculated by detecting the amplitudes of current and voltage. Since the value of the amplitude of the excitation voltage is predefined according to the invention it may be assumed to be known and, therefore, no longer needs measuring. Measuring the amplitude of the current flowing through the resonator may advantageously be effected by detecting the maximum value of this magnitude.

Preferably, such a regulation is performed in that the motor is always driven in optimal working order i.e. with its mechanical resonance.

In an independent achievement of the object of another embodiment, both the frequency and the amplitude of the excitation voltage are used as control variables for a regulation. Whereas the frequency is predefined so that the phase angle continues to be at a constant level, the amplitude of the excitation voltage is set so that the amplitude of the current remains constant. The amplitude of the current is a measure for the speed of the deformation of the electric resonator and thus for a rotary drive which is about proportional to the number of revolutions. By regulating the amplitude of the current to a constant value, the number of revolutions is kept constant in essence. This ensures that with increasing load the effective power increases, because with an increasing load, a consequent lowering of the amplitude of the current is canceled by an increase of the amplitude of the excitation voltage. With an increasing voltage and constant current as well as a phase angle (which is constant and fixedly predefined by the phase regulation unit) an increase of the effective power is reached when the load is increased.

A further aspect of the invention relates to the current flowing through the piezoelectric resonator. With a variable setting of the amplitude of the excitation voltage the current flowing through the piezoelectric resonator may strongly increase. If the current exceeds an upper limit value to be calculated for the respective motor, the resonator will most probably be destroyed. According to a further aspect of the invention a unit is therefore provided to limit the current flowing through the resonator. This may be an additional control loop becoming active only if a predefined critical current value is exceeded and reducing for example the amplitude of the excitation voltage in this case, so that a smaller current is set and the hazard of damage to the resonator is reduced.

These and other aspects of the invention are apparent from and will be elucidated with reference to the embodiments described hereinafter.

In the drawings:

FIG. 1 gives a diagrammatic representation of a piezoelectric resonator;

FIG. 2 gives a partially diagrammatic representation of a piezoelectric resonator with a driving circuit;

First will be explained in general the structure and the way of operation of known piezomotors.

Figure 1:
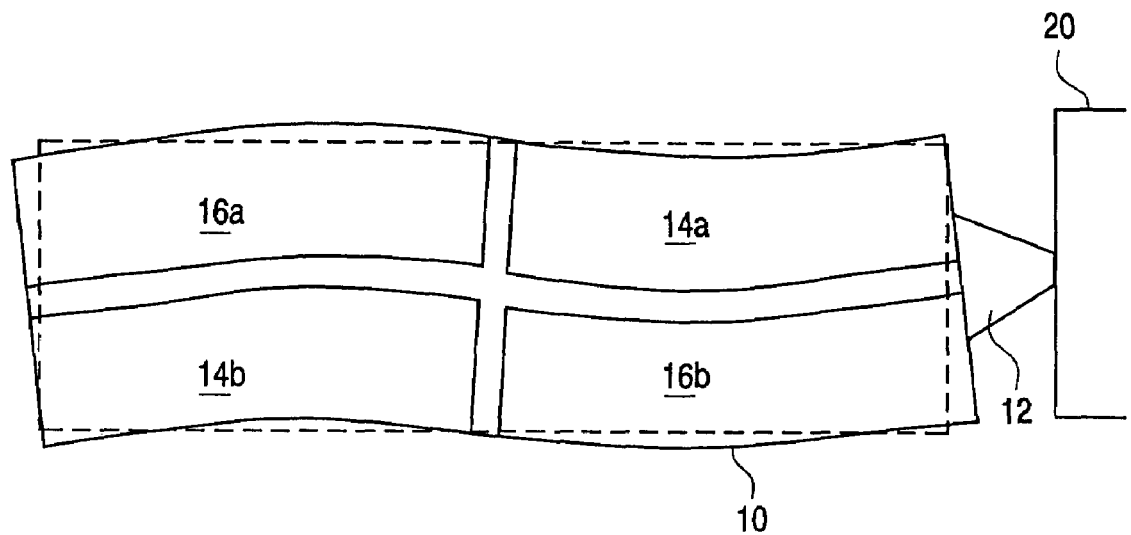

FIG. 1 shows as part of a piezomotor which works according to the principle of micro shock pulses of a piezoelectric resonator 10. This is a flat plate of piezoelectric material. The narrow front side of the resonator 10 has a spacer 12 which is pressed against the moving element 20.

On the top side of the resonator 10 shown there are arranged four electrodes 14a, 14b, 16a, 16b. The diagonally arranged electrodes 14a, 14b and 16a, 16b, respectively, form pairs. On the backside of the resonator (not shown) is arranged the backplate electrode covering the whole surface.

The principle and the mechanical way of operation of a piezoelectric drive utilizing such a piezoelectric resonator are known to a man of skill in the art and are therefore not explained in detail here. FIG. 1 shows the outside edges of the resonator in a state of rest as a dashed line. The resonator—drawn in unbroken lines—is deformed as a result of excitation on the electrodes. As is clearly visible from the exaggerated representation in FIG. 1, the resonator 10 can be deformed by applying a respective voltage to the paired associated electrodes 16a, 16b and 14a and 14b. As a result of the excitation of the electrode pair 14a, 14b (for the first direction of movement) and 16a, 16b (for the opposite direction of movement) with an AC voltage having a suitable frequency, the resonator 10 can be excited to mechanical oscillations which the spacer 12 transfers as movements to the moving element 20.

Figure 2:
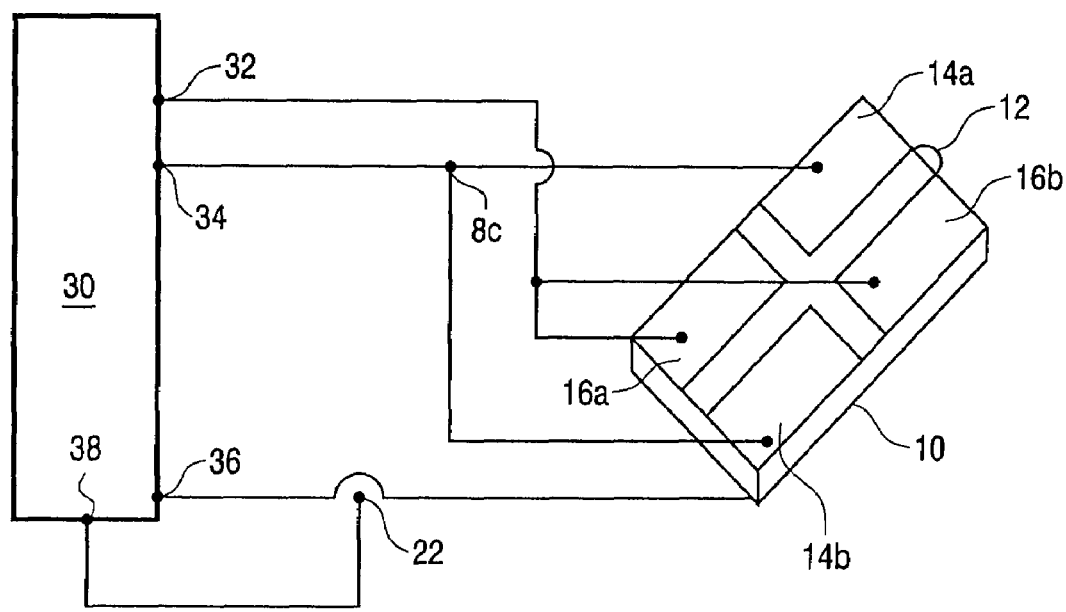

FIG. 2 shows in general a driving circuit 30 which renders sinusoidal AC voltages opposite a terminal 36 available on the terminals 32, 34 by which voltages the resonator 10 is excited. The terminal 36 is connected for this purpose to the back electrode (not shown) on the back of the resonator plate 10. Depending on the desired direction of movement, an AC voltage for exciting the electrode pair 14a, 14b or 16a, 16b is excited at the terminal 32 or 34. The driving circuit 30 can then set both the frequency and the amplitude of the driving voltages at the terminals 32, 34. For each direction of movement the resonator 10 is excited by only one AC voltage.

In addition, FIG. 2 shows a current sensor 22 which measures the current I that flows from the back electrode to the terminal 36. The measuring signal of the current sensor 22 is tapped from a terminal 38 of the driving circuit and used for the regulation as will be explained hereafter.

Figure 3A:
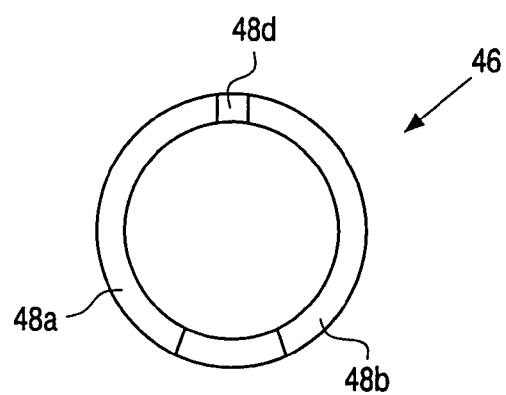
FIG. 3a is a plan view of a piezoelectric rotary motor.
Figure 3B:
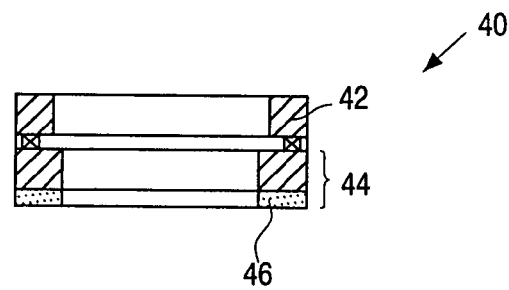
FIG. 3b is a side view of the rotary motor of FIG. 3a in cross-section.

A further embodiment of piezoelectric motors known to the man of skill in the art is shown in FIGS. 3a, 3b. This is an electric running wave motor 40 for the rotary drive as described, for example, in EP-A-0 654 889. The motor 40 comprises a rotor 42 and a stator 44 with a piezoelement 46. Driving electrodes 48a, 48b as well as a back electrode (not shown) and a monitor electrode 48d are arranged on the piezoelement 46 shown separately in FIG. 3a. The electrodes 48a, 48b are excited by two electric AC voltages having a 90° phase difference, so that a running wave is developed which brings the rotor 42 into rotation.

Figure 4:
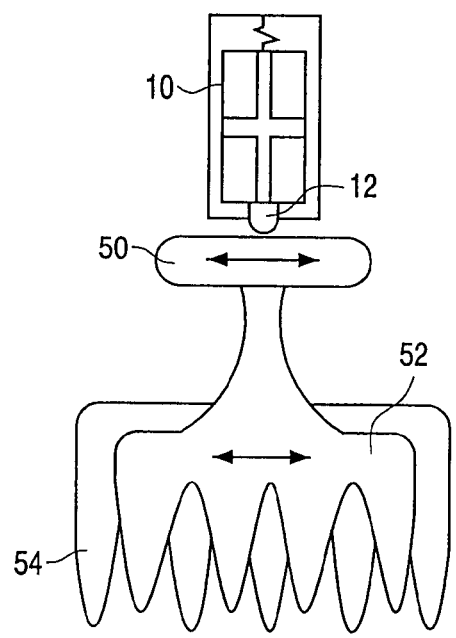
FIG. 4 is a diagrammatic representation of a piezoelectric drive for a shaver.

FIG. 4 shows an example of application of a micro shock pulse drive for generating a longitudinal movement, in which application the piezo drive is inserted into an electric shaver. A piezoelectric resonator 10 drives with its tappet 12 a moving element 50 longitudinally in transverse direction. This provides a shift of a first cutting blade 52 relative to a second cutting blade 54.

The examples of piezoelectric resonators and piezoelectric drives made therefrom and described above as well as their possibilities of use are shown here only for graphical purposes. A man of skill in the art is familiar with a great many piezodrives and applications thereof.

In the following the measures for generating a resonator oscillation suitable for driving a moving element and sufficiently known to a man of skill in the art will no longer be discussed here but the electrical properties of such piezoelectric drives will be examined in a general way.

About the permanent magnet DC motor which is driven by a constant supply voltage it is known that with a rising torque delivered the power applied to the motor increases. This motor characteristic has proved to be extremely advantageous in many applications. If the torque increases as a result of variations of load, the motor automatically takes up more current and thus more power, so that the torque delivered rises and the additional load can be overcome.

Looking at the respective characteristic of piezoelectric micro shock pulse drives, a completely different method is seen. When the supply voltage is kept constant (since the supply voltage is an AC voltage, the "kept constant" here refers to the amplitude) the power consumed by the motor decreases with increasing torque. This reduces the applicability of the motor for such applications in which load variations are to be taken into account. If, for example, a shaver is driven by a piezomotor (compare FIG. 4), the mechanical resistance to the motor is highly variable, depending on the fact whether the shaver is idling or is cutting several hairs or possibly a thick beard, respectively. In practice the behavior shown is expressed in that the motor easily stalls under greater load.

Figure 5A:
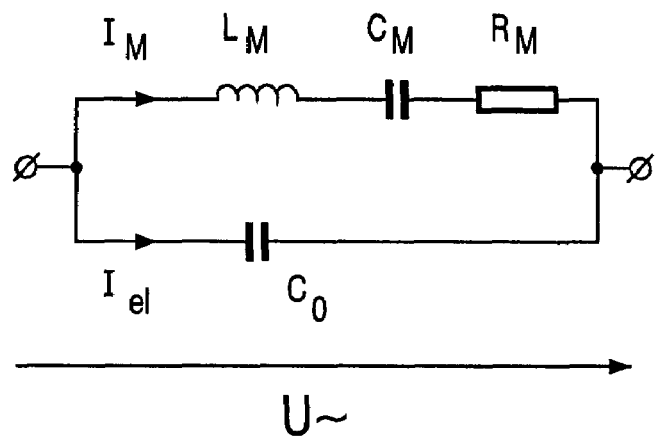
FIG. 5a is an equivalent circuit diagram for a free-running piezoelectric resonator.
Figure 5B:
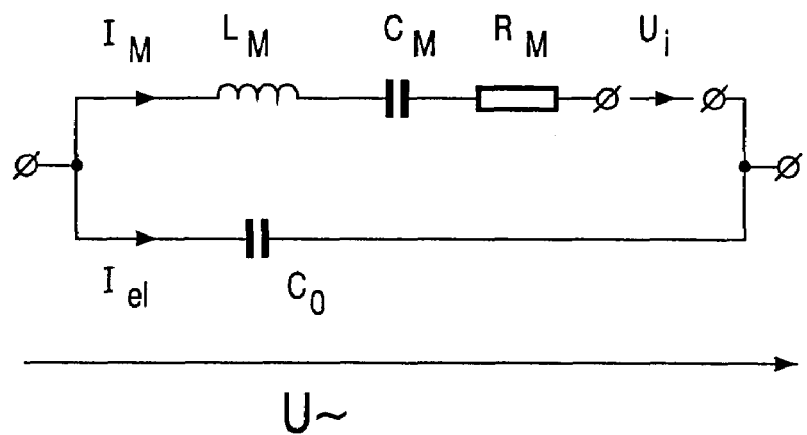
FIG. 5b shows an equivalent circuit diagram for a resonator in a piezomotor.

In principle this behavior can be explained by the equivalent circuit diagrams derived from the FIGS. 5a, 5b. They hold for all known types of piezomotors.

FIG. 5a shows the equivalent circuit diagram of a freely oscillating piezoresonator from a terminal capacitor $C_0$ and a mechanical branch having an inductance $L_m$ (this represents the oscillating ground), a capacitance $C_m$ (represents the rigidity) and an ohmic resistance $R_m$ (damping). The current flowing through the mechanical branch $I_m$ is a measure for the speed of deformation which is caused by applying the AC voltage U~.

As explained in general terms above, the resonator in a piezodrive periodically pushes against a moving member shown as a runner or rotor. FIG. 5b shows an equivalent circuit diagram of such a resonator in a piezomotor. The resonator then generates an impact which is taken into account by an internal voltage $U_i$ in the equivalent circuit diagram of FIG. 5b.

Figure 5C:
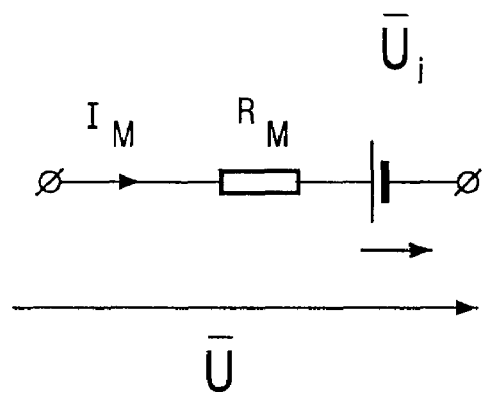
FIG. 5c shows an equivalent circuit diagram simplified compared to FIG. 5b of a resonator in a piezomotor under the assumption that the motor is driven with its mechanical resonance.

In a simplified equivalent circuit diagram of a motor as shown in FIG. 5c there is a transition from the voltages and currents changing with time to the average values which remain constant in each operating point on the motor characteristic, while it is assumed that the motor is operated in its mechanical resonance.

The amplitude of the current $I_m$ in this equivalent circuit diagram is actually a function of the velocity of the deformations in the resonator. Since the motor speed is derived from the speed of the deformations, the current $I_m$ is also a measure for the motor speed (in case of rotary components) or for the rate of feed of a runner (in case of longitudinal drives).

The voltage $\overline{Ui}$ is a function of the impact caused by the resonator. Since the power produced by the motor or the torque caused by the motor is derived from this impact, the voltage is also a parameter for the force or torque respectively.

If with a constant supply voltage $\overline{U}$ the moment produced by the motor increases as a result of variations of load, $\overline{Ui}$ will rise. The voltage drop over $R_m$ becomes smaller. The current $I_m$ diminishes, which corresponds to a diminishing of the speed. With an increasing torque the power consumed by the piezomotor therefore drops. The result is that micro shock pulse motors of said type which are arranged for an efficient operation in the neighborhood of the idling speed also have large speed variations in case of load variations.

To utilize the piezomotor also for applications with which large load variations may be expected, the following will describe three embodiments of a driving circuit in which the excitation voltage applied to the motor is always set such that with a rising torque at the motor the motor power remains at least constant or even increases.

The following examples assume a motor M containing a piezoelectric resonator. This resonator is operated with only one excitation AC voltage in the examples. Nevertheless, the examples are to be understood such that they can easily be generalized for all types of piezomotors known now, for example, also for piezomotors having a plurality of resonators such as described, for example, in EP-A-0 633 616. If a resonator is used which is excited not by only one but two (or more) AC voltages, the following examples may be used such that, on the one hand, only one of the excitation voltages and the associated current as regards the power are taken into consideration. The amplitude of the other voltages would then be set equal to the amplitude of the voltage concerned. Alternatively, each pair may be regulated separately by the excitation voltage and the associated current.

Figure 6:
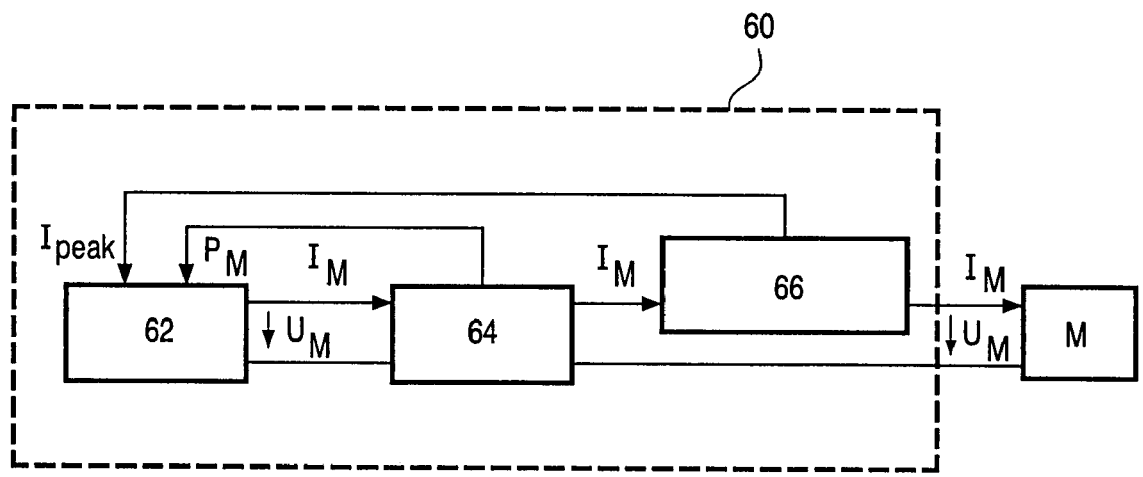
FIG. 6 shows a block circuit diagram of a first embodiment of the invention with a piezomotor and a driving circuit.

FIG. 6 shows in a block circuit diagram a first embodiment of the invention. A piezomotor M comprising at least one piezoelement is generally shown as a box. All the geometries and units of piezoelements known to a man of skill in the art are eligible for this piezomotor.

The piezomotor M is supplied with power by a driving circuit 60. This circuit comprises a controlled voltage supply unit 62, a power measuring unit 64 and a peak current sensor 66. The peak current sensor 66 senses the peak current of the current $I_M$ flowing from the voltage supply unit 62 to the motor M and applies the result of the sensing operation to the voltage supply unit 62. The power measuring unit 64 determines from the excitation voltage $U_M$ applied to the motor M by the voltage supply unit 62 and from the current $I_M$ flowing through the motor, the effective power $P_M$ consumed by the motor M and applies the result of the measurement to the voltage supply unit 62. The two measuring units, power measuring unit 64 and peak current measuring unit 66 are here considered to be ideal i.e. the measured voltages and currents are not changed by the measurement.

The excitation voltage $U_M$ and the resulting current $I_M$ flowing through the resonator are sinusoidal variables. Accordingly, the waveform of the excitation voltage $U_M$ is completely determined by its amplitude, frequency and phase position. The regulation following here first only deals with the regulation of the amplitude of the excitation voltage $U_M$. The man of skill in the art is familiar with corresponding circuits in which the amplitude and frequency of a generated AC voltage can be predefined in a mutually independent manner. In the present example the frequency of the excitation voltage $U_M$ is not discussed. The man of skill in the art is to separately choose the frequency, so that the resonator is excited for achieving a driving effect. Preferably the excitation voltage $U_M$ has such frequency that the resonator is operated close to its resonant frequency in a stable operating point with as high an efficiency as possible, ideally with its mechanical resonance.

The man of skill in the art is familiar with current sensors for measuring the current $I_M$. The peak value from a continuous current measurement can be determined here directly in the form of an analog circuit or afterwards, for example, in numerical form.

The power measuring unit 64 determines from the current $I_M$ and the voltage $U_M$ the effective power $P_M$ consumed by the motor M. Sinusoidal waveform and equal frequencies at $I_M$ and $U_M$ are then started from. Accordingly, the effective power is determined by determining the amplitude of the current $\hat{I}_M$ and the voltage $\hat{U}_M$ Known measures for phase detection, for example by comparison of the zero-crossings provide the phase angle $\phi$. The effective power $P_M$ is the result of:

$$P_M = \hat{U}_M * \hat{I}_M * \cos\phi.$$

The regulated voltage supply 62 comprises, on the one hand, a regulation unit and, on the other hand, a voltage supply unit (not shown) controlled by the regulation unit. The regulation unit processes the measured values $I_{PEAK}$ and $P_M$ and sets the amplitude of the excitation voltage $U_M$ in accordance with the following regulation strategy:

There is tested whether the value $I_{PEAK}$ is situated below a maximum value $I_{MAX}$. If this is the case, the value $I_{PEAK}$ is discarded for the further regulation. If, however, $I_{PEAK}$ exceeds the value $I_{MAX}$, the amplitude of the voltage $U_M$ is reduced until $I_{PEAK}<I_{MAX}$ During normal operation of the motor i.e. as long as $I_{PEAK}<I_{MAX}$, the amplitude of $U_M$ is regulated so that $P_M$ remains at a constant control value $P_{M,Soll}$. For this purpose a regulating difference $P_M-P_{M,Soll}$ is determined from $P_M$ and $P_{M,Soll}$ and with the aid of one of the regulation strategies sufficiently known to the man of skill in the art, for example, by means of a P, PI or PID controller, a control value for the amplitude of the voltage $U_M$ is set so that the regulating difference is adjusted to zero. For this purpose the amplitude of $U_M$ is increased if the regulating difference is negative, thus $P_M<P_{M,Soll}$. If the regulating difference is positive, $U_M$ is reduced.

The respective maximum value for the current $I_{MAX}$ is calculated in advance for the respective piezomotor M. The current flowing through a piezoelectric resonator is then proportional to the speed with which the piezoelement is deformed. From a value which corresponds in case of a longitudinal oscillator with a linear expansion of one per thousand, an enhanced hazard arises of damage to the piezoelement. The respective value $I_{MAX}$ at which such a deformation begins, can be calculated for the piezoelectric resonator used.

The arrangement for monitoring the current $I_M$ and for avoiding the exceeding of the limit value $I_{MAX}$ is represented here only in connection with the first embodiment. Such arrangement may also be left out. Such arrangement may also be used in all embodiments of the invention in which, based on the variable setting of the amplitude of the excitation voltage, the exceeding of the maximum value $I_{MAX}$ is not excluded.

In the first embodiment the power $P_M$ consumed by the motor is regulated to the control value $P_{M,Soll}$. This control value may be a constant value which corresponds, for example, to the nominal power of the motor. In a variant of the first embodiment (not shown) the control value $P_{M,Soll}$ becomes variable for the respective operating state of the motor. For this purpose a speed sensor is provided on the motor M which produces a measuring value for the speed of the motor. From this value a default value is calculated with the aid of a Table for the power necessary for the respective speed. This power is predefined in the regulating unit as a control value $P_{M,Soll}$ for the effective power.

The respective Table for the respective piezomotor and the respective application is calculated in advance. On the one hand the motor characteristic and on the other the requirements posed for the respective application are taken into consideration. Hereafter is shown such a table by way of example for a piezomotor used in an electric shaver, which drives a shaft at a nominal speed of 2000 U/min and is designed for a nominal power of 250 mW.

| Measured speed | $P_{M,Soll}$ |
|---|---|
| 1500 rpm | 400 mW |
| 1800 rpm | 300 mW |
| 2000 rpm | 250 mW |

Figure 7:
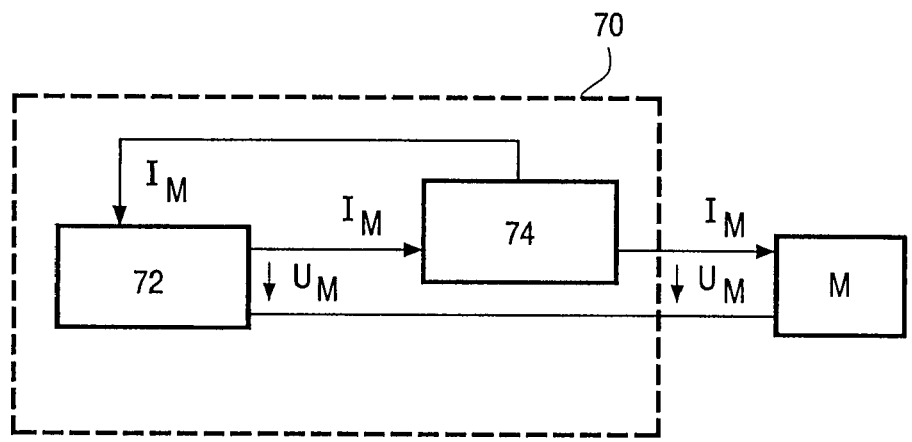
FIG. 7 shows a block circuit diagram of a second embodiment of the invention with a piezomotor and a driving circuit.

FIG. 7 shows a block circuit diagram of a second embodiment of the invention. Again the motor M is represented in general as a box, which is supplied with an excitation voltage $U_M$ by a driving circuit 70, so that a current $I_M$ flows.

The driving circuit 70 comprises a regulated voltage supply unit 72 and a current sensor 74. The current sensor 74 is used for measuring the current $I_M$. In this respect a measurement of, for example, the effective value of $I_M$ may be made, preferably, however, a measurement of the amplitude of the sinusoidal current $I_M$ in that its maximum value is determined. The result of the measurement of the current sensor 74 is applied to the regulated voltage supply unit 72.

The regulated voltage supply unit 72 comprises a regulating unit and a voltage supply unit (not shown) controlled by the regulating unit. The voltage supply unit produces an excitation voltage $U_M$ in line with the default of the regulating unit. The regulating unit then predefines independently of each other the frequency and the amplitude of the excitation voltage $U_M$.

The frequency of the excitation voltage $U_M$ is set by a phase regulation (not shown) so that a constant predefined phase angle is formed between $U_M$ and $I_M$. For a certain phase angle $\phi_{OPT}$ this corresponds to an operation of the motor with optimum efficiency. A respective phase regulation is described, for example, in DE-A-100 08 937. The detailed description is only referred to here. The phase regulation drives the motor with such a frequency that it has optimum efficiency. This is the case if the resonator is excited with its mechanical resonance. The exact position for the respective motor is dependent on various geometric and mechanical factors and is therefore to be determined for each application. The operating point with optimum motor efficiency is reached with a certain fixed phase angle between excitation voltage and current. The respective topical phase angle is determined by a phase detector and the frequency of the excitation voltage is predefined such that the phase angle is set to the desired value, thus the motor works with maximum efficiency.

Based on the phase regulation described above the determination of the effective power which is rather costly in the first embodiment shown in FIG. 6 is simplified. Since the value of the amplitude of $U_M$ is predefined by the regulating unit anyway and is therefore known, and the phase angle is additionally kept constant at the desired value, only the amplitude of the current $I_M$ is measured by the current sensor 74 and the active load is determined therefrom.

The regulating unit compares the thus formed value for the effective power $P_M$ with a predefined value and sets the amplitude of $U_M$ so that a constant effective power $P_M$ is achieved. If the power is too low, the voltage is increased and if the power is higher than the predefined value the voltage is reduced. This may be effected, for example, conventionally by forming a regulating difference and inserting a known regulator, for example, a P, Pi or PID controller.

Figure 8:
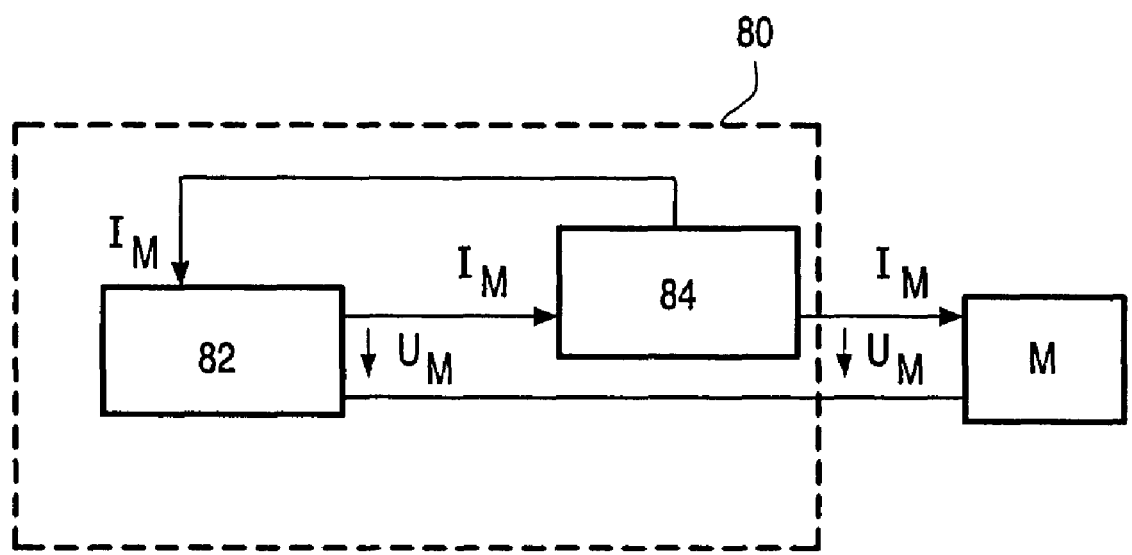
FIG. 8 shows a block circuit diagram of a third embodiment of the invention with a piezomotor and a driving circuit.

FIG. 8 shows a third embodiment of the invention. The piezomotor M again shown as a box is supplied with excitation voltage $U_M$ here by a driving circuit 80, so that a current $I_M$ flows.

The construction corresponds to the second embodiment shown in FIG. 7. The current $I_M$ is measured by a current sensor 84 and this measured value is applied to a regulated current supply unit 82. The current supply unit 82 comprises a regulating unit and a voltage supply unit (not shown). The voltage supply unit produces the excitation voltage $U_M$ in accordance with the predefined values of the regulating unit.

Also in the third embodiment the regulating unit comprises the phase control described above in connection with the second embodiment, which phase control predefines a constant phase angle between the excitation voltage $U_M$ and the current $I_M$.

The third embodiment, however, distinguishes itself from the second embodiment by the regulating strategy. The electric effective power $P_M$ applied to the motor is no longer explicitly determined. But the regulating unit utilizes the current $I_M$ as a controlled variable and sets the amplitude of the voltage $U_M$ so that the current $I_M$ is maintained at a constant value.

Even without a value for the power being determined, it is ensured here that with increasing load the power applied to the motor does not drop. For as can be recognized from the discussion in connection with the equivalent circuit diagrams 5a to 5c, an increased torque leads to an increase of the reverse voltage $U_i$ so that for maintaining a constant current $I_M$ an increase of the amplitude of the voltage $U_M$ is necessary. Thus since the phase angle $\phi$ (because of the phase regulation see above) is constant, the current $I_M$ is regulated to be constant and simultaneously the voltage $U_M$ rises, an increased load will lead to an increase of the electric power applied to the motor.

This third embodiment represents the embodiment preferred for use of the motor in an application with load variations that may be expected to be strong. Because with constant current, largely constant driving speed (for example, number of revolutions) may be started from as they are necessary, for example, for the application in an electric shaver.

The regulation unit processes the measured value produced by the current sensor 84 for the current $I_M$ and forms therefrom a difference with the set control value. This difference is applied to a P, PI or PID controller so that a predefined value for the amplitude of the voltage $U_M$ is calculated from this, so that the difference is reduced to zero.

The invention may be summarized in this respect that a piezoelectric driving device and a regulation method for such a driving device are proposed. Piezoelectric driving devices known thus far show a characteristic in which the electric power applied to the motor drops when the load increases. This behavior, which leads to a considerable limitation of the range in which such motors can be used, is counteracted in that the amplitude of the excitation voltage is predefined such that the effective power does not drop when the load increases. For this purpose the electric effective power is calculated from the excitation voltage and the current flowing through the piezoelectric resonator. Alternatively, with a predefined fixed phase angle between excitation voltage and current, a regulation may also be effected in that the current is kept at a constant value. A further aspect of the invention relates to an arrangement for limiting the current flowing through the piezoelectric resonator so as to avoid this element being damaged.

The invention claimed is:

1. A piezoelectric driving device comprising
at least one piezoelectric resonator,
a driving circuit for supplying the at least one piezoelectric resonator with at least one excitation AC voltage for exciting mechanical oscillations, and
a detector unit for determining an effective power applied to the at least one piezoelectric resonator from the at least one excitation AC voltage and a current flowing through the at least one piezoelectric resonator,
wherein the driving circuit is configured to prevent a drop in the effective power with increased load by changing an amplitude of the at least one excitation AC voltage.

2. The driving device as claimed in claim 1, wherein
the detector unit determines the electric effective power consumed,
from the amplitude of the at least one excitation AC voltage,
from an amplitude of the current,
and from a phase angle between the at least one excitation AC voltage and the current.

3. The driving device as claimed in claim 1, further comprising
a sensor for measuring a speed of a driven moving element,
and, in dependence on a result of the speed measured by the sensor, a predefined value is selected for the electric effective power.

4. The driving device as claimed in claim 1, wherein
the driving cirbuit predefines a frequency of the at least one excitation AC voltage, and
a phase angle between the at least one excitation AC voltage and the current is kept at a constant value.

5. The driving device as claimed in claim 4, further comprising
a current sensor for measuring the current,
wherein the current sensor measures a maximum value of the current.

6. A piezoelectric driving device comprising;
at least one piezoelectric resonator,
and a driving circuit for supplying the resonator with at least one excitation AC voltage for exciting mechanical oscillations,
a phase control unit which sets frequency of the at least one excitation AC voltage generated by the driving circuit so that
a phase angle between the excitation voltage ($U_M$) and a current flowing through the at least one piezoelectric resonator is kept at a constant value, and
an amplitude regulation unit which regulates the current by predefining an amplitude of the at least one excitation AC voltage.

7. The driving device as claimed in claim 1, further comprising
an arrangement for limiting the current.

8. The driving device as claimed in claim 7, wherein
the driving circuit is configured to regulate the amplitude of the at least one excitation AC voltage so that the current flowing through the piezoelectric resonator does not exceed an upper threshold.

9. An electric shaver comprising at least the piezoelectric electric driving device as claimed in claim 1.

10. A regulating method for a piezoelectric driving device comprising the acts of:
supplying a piezoelectric resonator with at least one excitation voltage for generating mechanical oscillations
determining an effective power applied to the piezoelectric resonator from the at least one excitation voltage and a current flowing through the piezoelectric resonator, and
setting an amplitude of the at least one excitation voltage so that the effective power does not drop when a load is increased.

* * * * *